United States Patent [19]

Pizzuti

[11] 4,129,371
[45] Dec. 12, 1978

[54] ELECTROMAGNET CONTROLLED SCANNING SHUTTER BLADE ARRANGEMENT

[75] Inventor: Donato F. Pizzuti, Saugus, Mass.

[73] Assignee: Polaroid Corporation, Cambridge, Mass.

[21] Appl. No.: 830,111

[22] Filed: Sep. 2, 1977

[51] Int. Cl.$^2$ .......................... G03B 9/08; G03B 9/40
[52] U.S. Cl. .................................... 354/234; 354/247; 354/266
[58] Field of Search ................. 354/83, 234, 235, 247, 354/251, 266, 230, 248, 249; 352/207; 353/91

[56] References Cited

U.S. PATENT DOCUMENTS

| | | | |
|---|---|---|---|
| 3,241,471 | 3/1966 | Burgarella | 354/235 |
| 3,425,329 | 2/1969 | Starp | 354/266 X |
| 3,593,630 | 7/1971 | Douglas | 354/29 |
| 3,618,500 | 6/1969 | Douglas | 354/251 X |
| 3,820,131 | 6/1974 | Tanaka | 354/247 X |
| 3,903,538 | 9/1975 | Yoshizaki | 354/251 X |
| 3,922,698 | 11/1975 | Petersen | 354/235 |
| 3,946,413 | 3/1976 | Onda et al. | 354/251 |
| 3,961,345 | 6/1976 | Arisaka | 354/234 |
| 4,054,889 | 10/1977 | Tsujimoto | 354/83 |

Primary Examiner—L. T. Hix
Assistant Examiner—William B. Perkey
Attorney, Agent, or Firm—Edward S. Roman

[57] ABSTRACT

A "scanning type" photographic shutter blade mechanism is manually actuated to open, thereby commencing a photographic exposure cycle, by a resilient opening drive element. The "scanning type" shutter blade mechanism is thereafter closed to terminate the photographic exposure cycle by deenergizing an electromagnet which in turn releases a shutter blade closing drive member resiliently biased to engage the shutter blade mechanism and move it to the closed position against the yieldable bias of the opening drive element. Subsequent manual deactuation of the camera operates to recock the shutter blade closing drive member so as to ready the camera for a subsequent photographic exposure cycle.

15 Claims, 6 Drawing Figures

ELECTROMAGNET CONTROLLED SCANNING SHUTTER BLADE ARRANGEMENT

BACKGROUND OF THE INVENTION

1. Field of the Invention

This invention relates generally to an electromagnet controlled scanning shutter blade system, and more particularly, to a photographic scanning shutter blade arrangement wherein the closing movement is controlled by way of an electromagnet actuated drive which may be recocked in a simple manner.

2. Description of the Prior Art

Thin and compact photographic cameras of the reflex type have been developed wherein the exposure of the film unit is electronically controlled and the film unit may be rapidly processed at a processing station within the photographic camera. A version of such a camera having a compactness and thinness suited to permit convenient carrying in the pocket of a garment is described in U.S. Pat. No. 3,672,281, entitled "Reflex Camera" by E. H. Land. Such cameras are of the single lens reflex variety and require a complex exposure control system in order to accommodate a requisite viewing and focusing mode during which time the single lens reflex camera is in a normally open status to unblock the passage of light through the exposure opening to a viewfinder. An exposure control system ideally suited for such a camera is described in U.S. Pat. No. 3,641,889, issued by V. K. Eloranta. This exposure system is characterized by the use of a tractive electromagnetic device, preferably a solenoid, for controlling the movement of a pair of "scanning type" shutter blade elements. Use of a solenoid driven "scanning type" shutter system allows for the development of dual exposure parameter regulation (aperture and speed) of the exposure value of any given exposure. For instance, following an initial energization of the solenoid, it may be deenergized to permit the blades of the exposure mechanism to progressively open under a spring bias to define a gradually enlarging aperture. The exposure interval may then be terminated by again energizing the solenoid to rapidly drive the exposure mechanism blades to a closed orientation. Controlled initial deenergization of the solenoid for purposes of commencing exposure interval, as well as subsequent energization of the solenoid to terminate an exposure interval, is carried out by an electronic control circuit which operates in conjunction with a light sensing network arranged to be responsive to light levels of the scene being photographed. Such solenoid actuated "scanning type" shutter blade arrangements have also been utilized in non-reflex cameras such as Polaroid Corporation's newly marketed Pronto type cameras.

The use of a solenoid to drive a "scanning type" shutter blade arrangement is limited, however, in the speed at which the shutter blade elements can be driven from their scene light blocking position. Solenoids include an internally disposed plunger or armature which is drawn within an excitation winding during the energization thereof and the acceleration of the plunger is limited by the time delay required for the solenoid to develop a maximum magnetic flux condition to arrest the outward movement of the plunger from the excitation winding. Solenoid actuated shutter blades may also encounter pull and time variations due to power variations in the camera power supply.

One attempt at solving the problems encountered as a result of voltage level variations in a camera battery supply which might affect the solenoid pull in time is disclosed in U.S. Pat. No. 3,922,698 entitled "Dynamically Compensated Exposure Control System" by C. Peterson, issued Nov. 25, 1975. Peterson discloses an exposure control system wherein the actuating drive or solenoid of the system is coupled to be operated only against a substantially constant force of a spring bias, while the exposure mechanism movement with its attendant mass acceleration characteristics is provided by a spring drive isolated from the spring bias against which the solenoid is driven. Thus, by isolating the solenoid from the spring drive serving to close the shutter, there may be provided a constant rate of shutter blade closing despite variations in the power supply to the camera. However, the shutter blade closing speed is still limited by the time required to pull in the solenoid plunger as is the case where the solenoid operates directly on the shutter blade mechanism to drive the shutter blades to their scene light blocking position.

Shutter blade arrangements embodying two electromagnets as disclosed in U.S. Pat. No. 3,593,630 entitled "Breaking and Sequencing Mechanism" by L. Douglas et al., issued July 20, 1971, can provide quicker shutter blade closing times than are possible with the aforementioned solenoid actuated "scanning type" shutter arrangement. The Douglas shutter arrangement, however, is not of the "scanning type" and thus does not provide the advantages appertaining to a "scanning type" shutter blade arrangement, i.e., greater depth of field resulting from a slow progressive opening of the aperture. The aperture of Douglas is defined instead by a diaphragm element separate and distinct from the shutter closing assembly which is controlled by the electromagnets.

Therefore, it is a primary object of this invention to provide a camera exposure control system embodying "scanning type" shutter blade elements which may be quickly closed without the use of a solenoid.

It is a further object of this invention to provide a camera exposure control system for use with "scanning type" shutter blade elements wherein the exposure may be quickly terminated by way of a shutter blade closing drive spring actuated through an electromagnet.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A photographic camera apparatus having means for mounting a photographic film material at a given focal plane is provided with a blade mechanism for displacement along a predetermined path between a first arrangement wherein it precludes scene light from reaching the film plane and a second arrangement wherein it defines a maximum size aperture. The blade mechanism serves to define a range of progressively increasing sized apertures as it moves from its first arrangement to its second arrangement. The camera initially includes a first selectively actuable drive means for urging displacement of the blade mechanism from its first arrangement toward its second arrangement. A second actuable drive means is provided for urging displacement of the blade mechanism from its second arrangement back toward its first arrangement against the urging of the first drive means. First latch means movable between first and second positions are provided for holding the blade mechanism in its first arrangement against the urging of the first drive means and for simultaneously restraining the second drive means from urging displacement of the blade mechanism back toward its first arrangement while the first latch means is in its first position. The first latch means are selectively actuable to move from the first position to the second position to effect a release of the blade mechanism and the second drive means. The blade mechanism thereafter moves under the influence of the first drive means from its first arrangement toward its second arrangement to commence an exposure cycle. Second latch means operate to restrain the second drive means from urging the displacement of the blade mechanism upon the release of the second drive means by the first latch means. The second latch means is thereafter actuable to cause the release of the second drive means and effect the displacement of the blade mechanism from its first arrangement back toward its second arrangement against the urging of the first drive means thereby completing the exposure cycle. The second latch means may thereafter be automatically recocked by way of a film advancing and processing mechanism.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment or when read in connection with the accompanying drawings wherein like numbers have been employed in the different figures to denote the same parts and wherein:

DESCRIPTION OF THE PREFERRED EMBODIMENT

Figure 1:
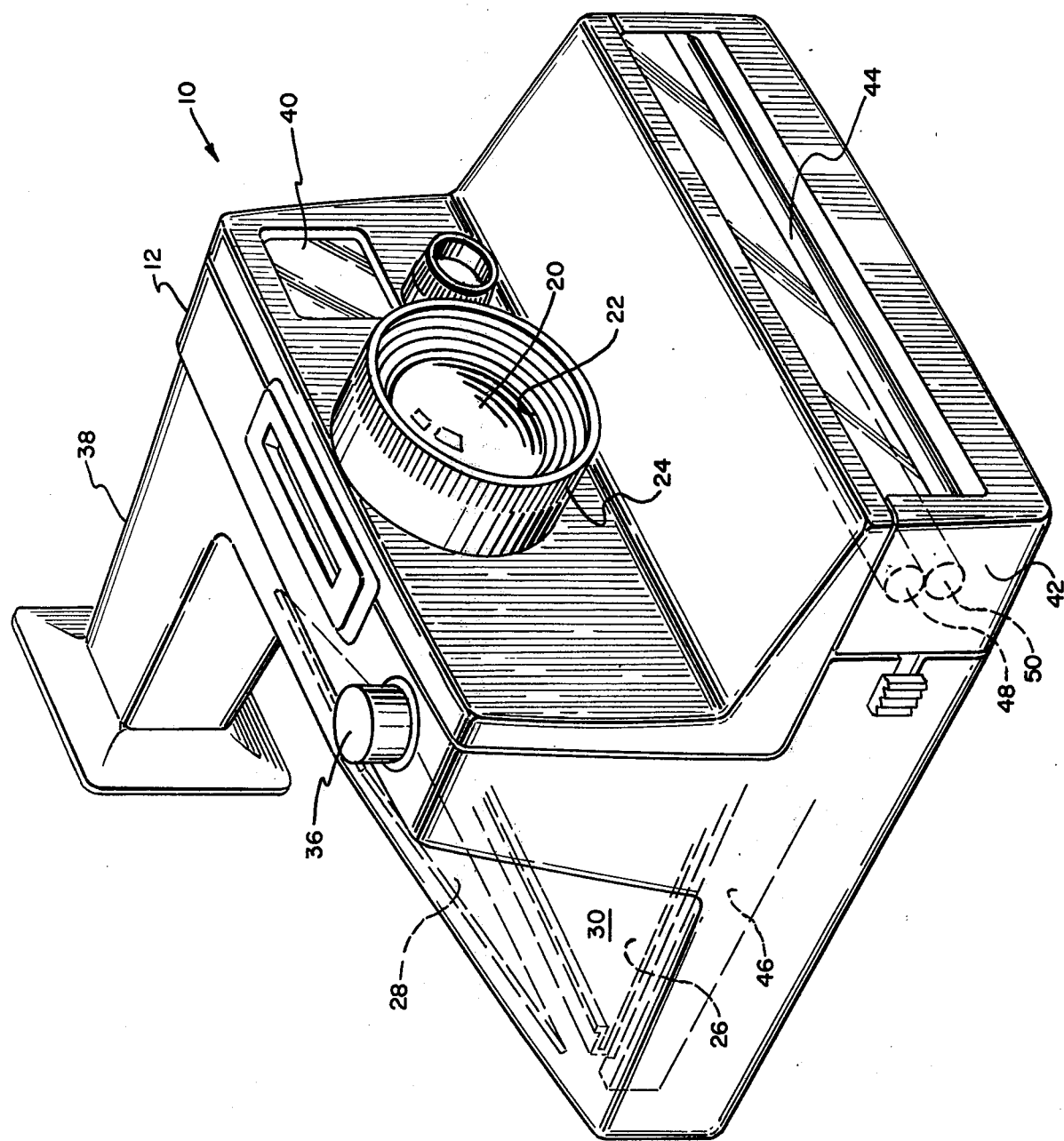
FIG. 1 is a perspective view of a camera embodying the exposure control system of this invention.
Figure 2:
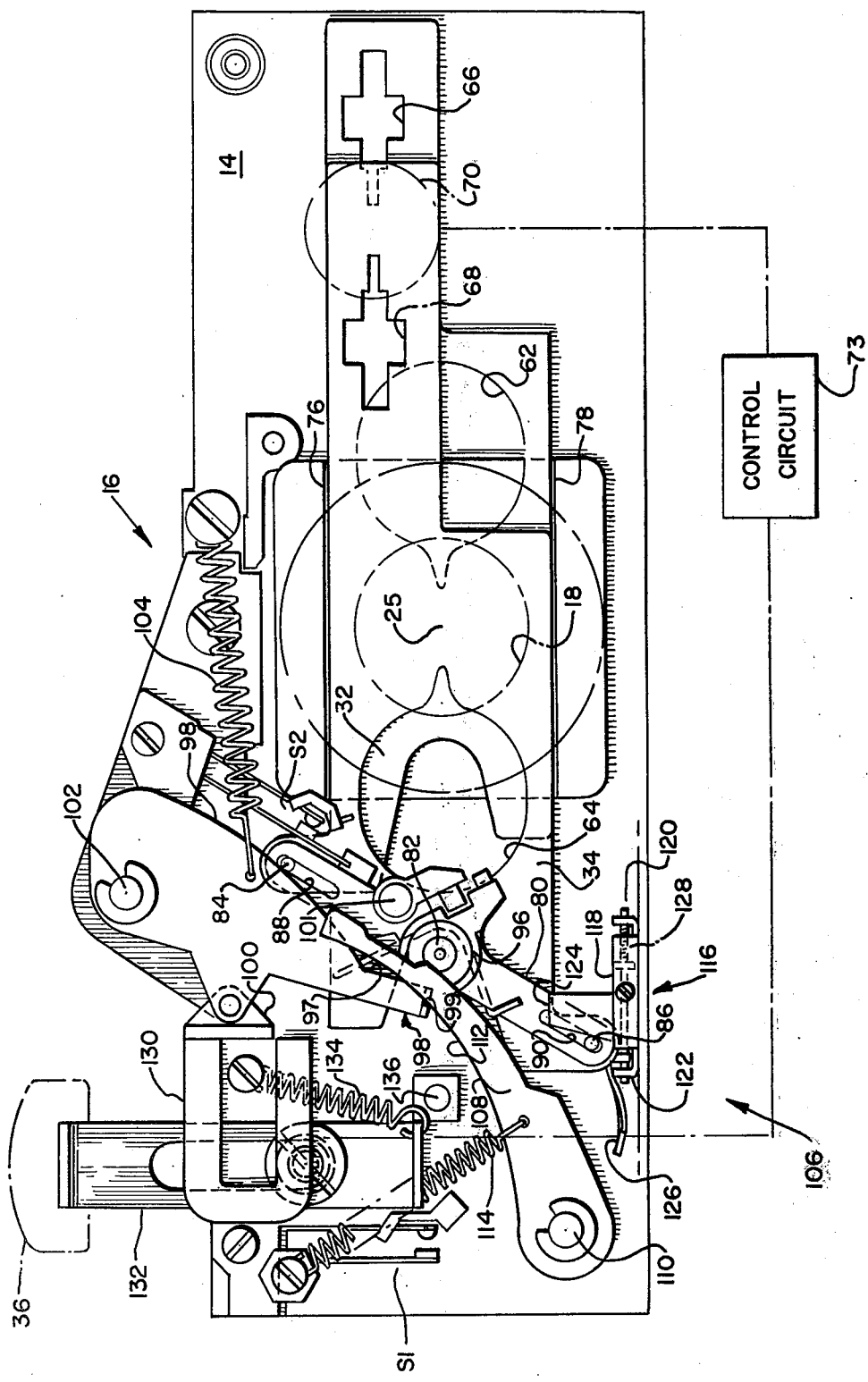
FIG. 2 is a front elevation of the exposure control system of this invention with the camera housing of FIG. 1 broken away.

Referring now to FIGS. 1 and 2 it can be seen that the exposure control system of this invention may be associated with a photographic camera apparatus 10 contained within a housing shown generally at 12. A base block casting 14 is fixedly stationed within the housing 12 and is selectively machined to support the various components of an exposure control mechanism shown generally at 16. In that portion of the housing 12 which surrounds the top and front of the base block casting 14, there is provided at least one opening through which extends a manually adjustable focus bezel 24. Centrally disposed within the base block casting 14, there is provided a light entering exposure opening 18 which may define the maximum available exposure aperture for the system.

An objective or taking lens 20 is provided in overlying relation to the light entering opening 18 wherein the objective lens 20 may comprise a plurality of elements retained in predetermined spaced relation by a cylindrical lens mount 22 which is externally threaded for toothed engagement with the internally threaded focus bezel 24. As is readily apparent, focus bezel 24 is made rotatable with respect to the housing 12 to provide translational movement of the elements of lens 20 along a center axis 25 of the optical path of the housing 12. As is readily apparent, the central optical axis 25 is illustrated in FIGS. 2 through 5 as being normal to the plane of the drawing. Thus, rotation of the focus bezel 24 may be carried out by manual rotation to provide displacement of the elements of objective lens 20 for focusing of image carrying rays through the light entering exposure opening 18 to a rearwardly positioned film plane 26 by way of a reflecting mirror 28 all of which are stationed within a suitable lighttight film exposure chamber 30 within the housing 12.

Intermediate the objective lens 20 and light entering exposure opening 18, there is provided a shutter blade mechanism including two overlapping shutter blade elements 32 and 34 of the so called "scanning type" which will be subsequently described in greater detail herein. Extending from the top of housing 12, means are provided for manually controlling the actuation of a photographic cycle by way of a button 36, the depression of which commences the exposure interval and ultimately affects the release of the shutter blade elements 32 and 34 in a manner to be subsequently described herein.

The housing 12 may include an integrally molded viewfinder portion 38 extending rearwardly from the front thereof. The viewfinder portion 38 of the housing 12 affords protection to the internal components positioned therein to enable a user to aim the camera and frame a desired subject of a scene to be photographed through a window 40 included within the front of the housing 12.

A film loading access door 42 including a film withdrawal slot 44 transversely disposed therein is pivotally mounted for movement between positions blocking and unblocking an open end of the chamber 30 included within the housing 12 for receiving and supporting a film cassette or container 46 therein in the usual manner. The cassette 46 encloses an assemblage including a plurality of film units and a dark slide superpositioned thereto in the usual manner for preventing exposure of a forwardmost film unit prior to insertion of the film cassette 46 into the chamber 30. The film units are multilayered structures including one or more photosensitive image receiving layers arranged in superposed relation and a rupturable pod containing a supply of fluid processing composition attached to a leading end of the film unit. The film cassette 46 including the assemblage is similar to that disclosed and defined in U.S. Pat. No. 3,874,875 issued to E. H. Land on Apr. 1, 1975. The film units included in the assemblage represent a general class of "integral type" self-developing type film units similar to that described in U.S. Pat. No. 3,415,644 issued to E. H. Land on Dec. 10, 1968. The film cassette 46 is shown in position within the film receiving chamber 30 of the camera in FIG. 1.

Subsequent to exposure, each forwardmost film unit is advanced from the film cassette 46 in the usual manner into the bite of a pair of juxtaposed pressure-applying members or rollers 48 and 50 mounted adjacent the film withdrawal slot 44 in the film loading access door 42 as best seen in FIG. 1. The film loading access door 42 is pivotally connected to housing 12 in such a manner as to allow the access door 42 and the rollers 48 and 50 to be pivoted downwardly to provide access to the film receiving chamber for loading and unloading the film cassette 46 in the usual manner. A detailed description of the manner in which the film loading access door and rollers 48 and 50 are coupled to the remainder of the camera may be found in U.S. Pat. No. 3,974,510 issued Aug. 10, 1976, in the name of Andrew S. Ivester, entitled "A Mounting Apparatus for A Spread Roller Assembly". The rollers 48 and 50 are suitably mounted within the access door 42 by a mounting bracket (not shown).

A pair of scene light admitting primary apertures 62 and 64 are provided respectively in the blade elements 32 and 34 to collectively define a progressive variation of effective aperture openings in accordance with longitudinal displacement of one blade element with respect to the other blade element in a well known manner. The apertures 62 and 64 are selectively shaped so as to overlap light entering exposure opening 18 thereby defining a gradually varying effective aperture size as a function of the position of the blade elements 32 and 34.

Each of the blades 32 and 34 may additionally be configured to have corresponding photocell sweep secondary apertures shown respectively at 66 and 68. Secondary apertures 66 and 68 may be configured in correspondence with the shapes of scene light admitting primary apertures 62 and 64. As is readily apparent, the secondary apertures 66 and 68 also move in correspondence with the primary apertures 62 and 64 to define a small secondary effective aperture for admitting the passage of scene light transmitted through the window 40 in the front of the housing 12 from the scene to be photographed.

Scene light admitted by the photocell secondary apertures 66 and 68 is thereafter directed to a light detecting station shown generally at 70. The light detecting station 70 includes a photoresponsive element (not shown) which cooperates with a light integrating capacitor together with a light integrating and control circuit all of which form a part of a control circuit as shown diagramatically in block form at 73 and which are more fully described in U.S. Pat. No. 4,017,873 entitled "Exposure Control System With Breaking Capability" by E. K. Shenk issued April 12, 1977. In this manner, the exposure interval can be terminated as a function of the amount of light received through the secondary effective aperture defined by the overlapping photocell sweep secondary apertures 66 and 68.

Projecting from the base block casting 14 at locations spaced laterally apart from the light entering exposure opening, there is provided a pair of elongated tracks 76 and 78 slidingly engaged to the shutter blades 32 and 34.

Figure 3:
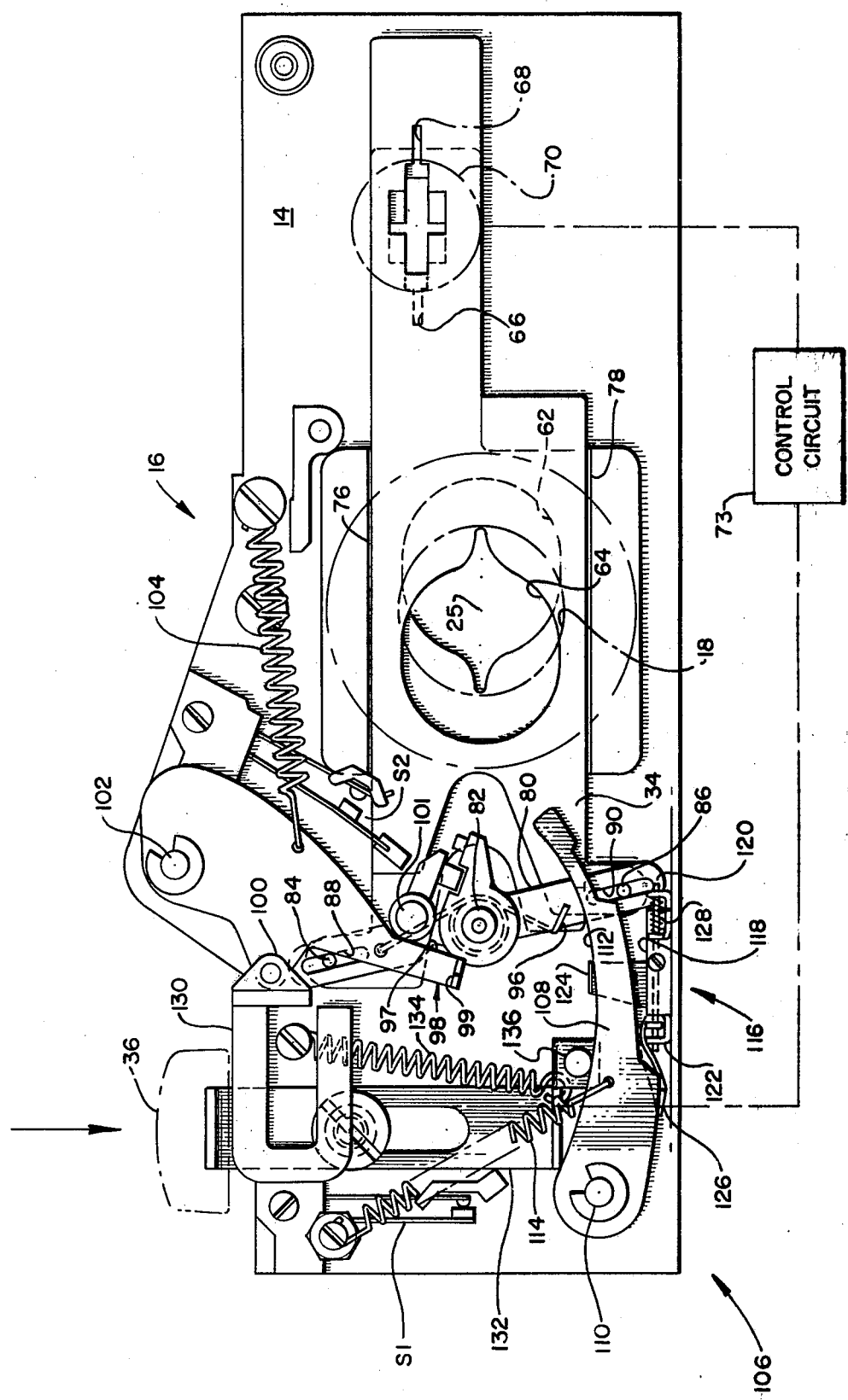
FIG. 3 is a front elevation of the exposure control system of FIG. 2 in another mode of its operation.

The opposite ends of the blade elements 32 and 34 respectively include extended portions which pivotally connect to a walking beam 80. Walking beam 80, in turn, is disposed for rotation relative to the base block casting 14 by pivotal connection to a projecting pivot pin or stud 82 which may be integrally formed with the base block casting 14 at a located spaced laterally apart from the light entering exposure opening. The walking beam 80 may be pivotally retained to the pin 82 by conventional means such as an E ring. The walking beam 80 is pivotally connected at its distal ends to respective shutter blade elements 32 and 34 by respective pin members 84 and 86 which extend laterally outward from respective blade elements 32 and 34. Pin members 84 and 86 are preferably circular in crosssection and extend through respective elongated openings 88 and 90 in walking beam 80 so as to slidably engage the walking beam 80 during reciprocal translation of the shutter blade elements 32, 34 along the tracks 76, 78. Thus, the shutter blade elements 32 and 34 define a blade mechanism which is mounted for reciprocal displacement between at least one scene light blocking arrangement precluding transmission of scene light to the film plane 26 as shown in FIG. 2 and a scene light unblocking arrangement defining at least one aperture value structured for transmission of scene light to the film plane 26 as shown in FIG. 3. The means for mounting the blade mechanism for such displacement collectively comprise the walking beam 80 together with the tracks 76 and 78.

Means which are ultimately selectively actuable are provided for driving the shutter blade elements 32 and 34 from the scene light blocking arrangement toward the scene light unblocking arrangement and comprise a torsion spring element 96 having one end connected to the walking beam 80 and the other end grounded with respect to the base block casting 14. Means are also provided for driving the shutter blade elements 32 and 34 from their scene light unblocking arrangement back to their scene light blocking arrangement and comprise a rotatable lever arm 98 disposed for pivotal movement about a pivot pin 102. The opposite end of the lever arm 98 from the pivot pin 102 defines a right angle bent tab portion 99. Counterclockwise rotation of the lever arm 98 operates to move the leading edge thereto (as shown at 97) into engagement with a pivot pin 101 extending laterally outward from the side of the walking beam 80. A resilient tension spring element 104 connecting at one end to the lever arm 98 and fixedly connected at its other end with respect to the base block casting 14 is provided for continuously urging the lever arm to rotate into engagement with the pivot pin 101 extending outward from the walking beam 80. The method by which the lever arm 98 drives the shutter blade elements 32 and 34 from their scene light unblocking arrangement back to their scene light blocking arrangement will be made apparent from the following discussion. As will be readily understood, the torsion spring element 96 may alternatively be either a compression or a tension spring as long as the spring is connected to continuously urge the walking beam 80 to rotate in a counter clockwise direction as viewed in FIGS. 2 through 5 thereby continuously urging the shutter blade element 32 and 34 to move into their scene light unblocking arrangement as shown in FIG. 2.

First latch means, movable between first and second positions, are provided for restraining the blade mechanism in its scene light blocking arrangement against the urging of spring element 96 and for restraining the rotatable lever arm 98 from urging displacement of the blade mechanism while the first latch means is in its first position as shown generally at 106. The latching means 106 comprises a member 108 disposed for rotatable movement about a pivot pin 110 between a first position as shown in FIG. 2 and a second position as shown in FIG. 3. The rotatable member 108 has a cam surface 112 associated therewith for engagement with the end tab portion 99 of the rotatable lever 98 in a manner to be subsequently described. A resilient spring element 114 connecting at one end to the rotatable member 108 and fixedly connected with respect to the base block casting 12 at its other end is provided for yieldably biasing the rotatable member for counterclockwise rotation about the pivot pin 110 as viewed in FIGS. 2 through 5.

Figure 6:
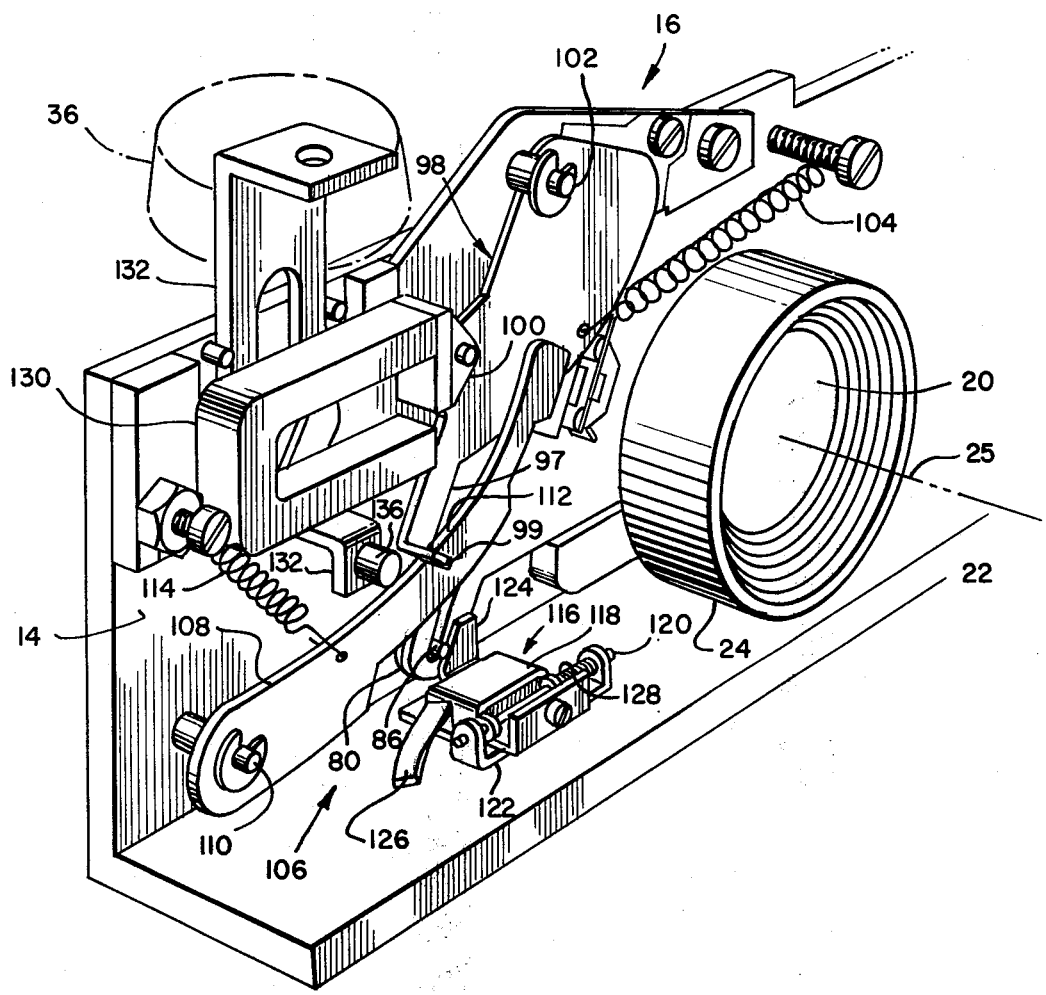
FIG. 6 is a perspective view of a portion of the exposure control system of FIG. 2.

The latch means 106 additionally includes a latching mechanism shown generally at 116 comprising a rotatable latch member 118 (best viewed in FIG. 6) disposed for rotation about a pivot pin 120 between a first position as shown in FIGS. 2 and 6 and a second position as shown in FIG. 3. The pivot pin 120 is rotatably supported by means of a U shaped bracket 122 which is fixedly stationed with respect to the base block casting 14. An integral lever arm portion 124 extends outward of the latch member 118 so as to engage the shutter blade pin 86 when the latch member 118 is in its first position in order to hold the blade mechanism in its scene light blocking arrangement against the urging of the spring element 96. Means for moving the latching means 116 additionally include a biasing torsion spring 128 which operates to yieldably bias the rotatable latch member 118 to rotate from its second position back to its first position. The rotatable latch member 118 additionally includes another integral lever arm portion 126 extending outwardly therefrom into engagement with the locus of travel of the rotatable member 108 for reasons which will become apparent from the following discussion.

Another latching means is provided by way of an electromagnet 130. The electromagnet 130 may be energized to attract a magnet keeper 100 fixedly connected to the rotatable lever arm 98 thereby restraining the lever arm 98 from counterclockwise rotation under the yieldable biasing influence of the spring element 104.

Means which are manually actuable by way of the button 36 are provided for controlling the actuation of the rotatable member 108. Toward this end there is provided an actuating member 132 disposed for vertical reciprocal translation with respect to the base block casting and connected at one end to the button 36. The actuating member is resiliently biased by way of a tension spring element 134 to move in a direction outward of the housing 12. The actuating member 132 includes an integral leading pin portion 136 which is disposed to engage the cam surface 112 of the rotatable member 118 upon the inward depression of the button 36 and its associated actuating member 132 in a manner to be subsequently described.

Referring now to FIG. 2 there may be seen the condition of the exposure control system of this invention immediately prior to the initiation of a photographic exposure cycle. As is readily apparent, the latching means 106 is in its first position with the rotatable member 108 rotated to its extreme counterclockwise position by its biasing spring 114 so as to engage the tab portion 99 of the rotatable lever arm 98 and restrain its operative influence on the blade mechanism. In order to accomplish this result, it is readily apparent that the biasing influence of spring element 114 substantially overrides the biasing influence of spring element 104. In addition, it can be seen that the latch mechanism 116 is also biased to rotate into its first position by its torsion spring 128 thereby restraining the blade mechanism in its scene light blocking arrangement against the yieldable urging of its drive spring element 96.

Depressing the button 36, in turn, operates to drive the actuating member 132 downwardly until the leading pin portion 136 thereof engages the cam surface 112 of the rotatable member 108 in a manner operating to rotate the member 108 in a clockwise direction about its pivot pin 110 against the yieldable biasing of its spring element 114. In this manner the rotatable member 108 is moved from its first position as shown in FIG. 2 to its second position as shown in FIG. 3. Upon approaching its second position, the leading edge of the rotatable member 108 engages the end of the integral lever arm portion 126 from the rotatable latch member 118 so as to rotate the latch member 118 about its pivot pin 120 from its first position as shown in FIGS. 2 and 6 to its second position as shown in FIG. 3. Movement of the rotatable latch member 118 from its first position to its second position, as is now readily apparent, affects the release of the blade mechanism which thereafter moves under the influence of its driving spring element 96 from its scene light blocking position as shown in FIG. 2 toward its scene light unblocking position as shown in FIG. 3 to commence an exposure cycle.

Such rotation of the member 108 from its first position to its second position also operates to disengage the member 108 from the blade driving lever arm 98. However, the blade driving lever arm 98 is restrained by way of its magnet keeper 100 which is attracted to the electromagnet 130 which becomes immediately energized upon the initial depression of the button 36 by way of a switch S1. Electrical energy to power the electromagnet 130 by way of the switch S1 may be provided by a battery superpositioned with respect to the film units and dark slide in the film cassette 46 in a manner as is now known in the art.

Figure 5:
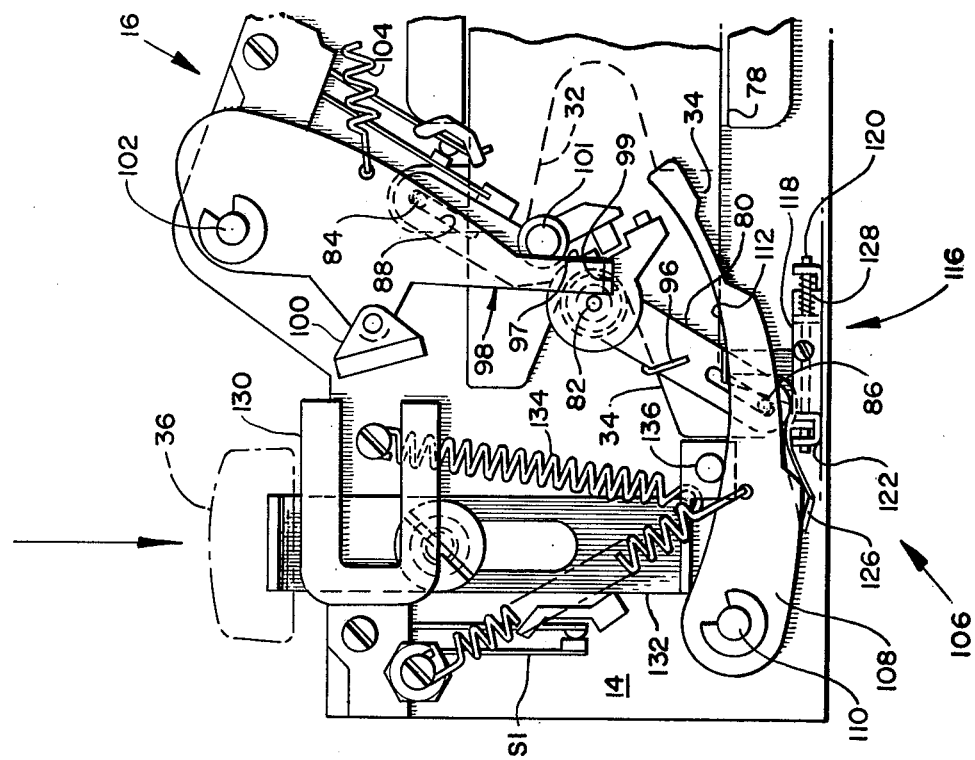
FIG. 5 is a front elevation of the exposure control system of FIG. 4 in another mode of its operation.

Disengagement of the walking beam 80 from the latch mechanism 116 in the aforementioned manner permits the walking beam 80 to rotate in clockwise direction about its pivot pin 80. The shutter blade elements 32 and 34, are thus moved in concert with the walking beam 80 under the influence of their driving spring element 96 from their scene light blocking position to their scene light unblocking position to commence the exposure cycle. The control circuit 73 which may be actuated by way of the opening of a second switch S2 integrates scene light received by way of the scene light detecting station 70 in the usual manner until a desired exposure value has been reached at which instant the control circuit 73 provides a control signal to deenergize the electromagnet 130. Deenergization of the magnet 130, in turn, operates to release the magnet keeper 100 of the lever arm 98 whereupon the lever arm 98 is rotated in a clockwise direction as viewed in FIG. 5 under the operative influence of its resilient biasing spring 104. Continued clockwise rotation of the rotatable lever arm operates to bring the leading edge 97 thereof into engagement with the pin 101 extending laterally outward of the walking beam 80 so as to rotate the walking beam 80 in a clockwise direction thereby driving the shutter blade elements 32 and 34 from their scene light unblocking arrangement back to their scene light blocking arrangement as seen in FIG. 5. Thus, in this manner is a photographic exposure cycle terminated at a rate which is faster than would othewise be possible by the use of a solenoid in the usual manner. As is now readily apparent, the lever arm biasing spring 104 exerts a substantially greater driving force than the opening drive spring element 96 so as to drive the walking beam 80 towards its scene light blocking arrangement against the urging influence of drive spring 96.

Figure 4:
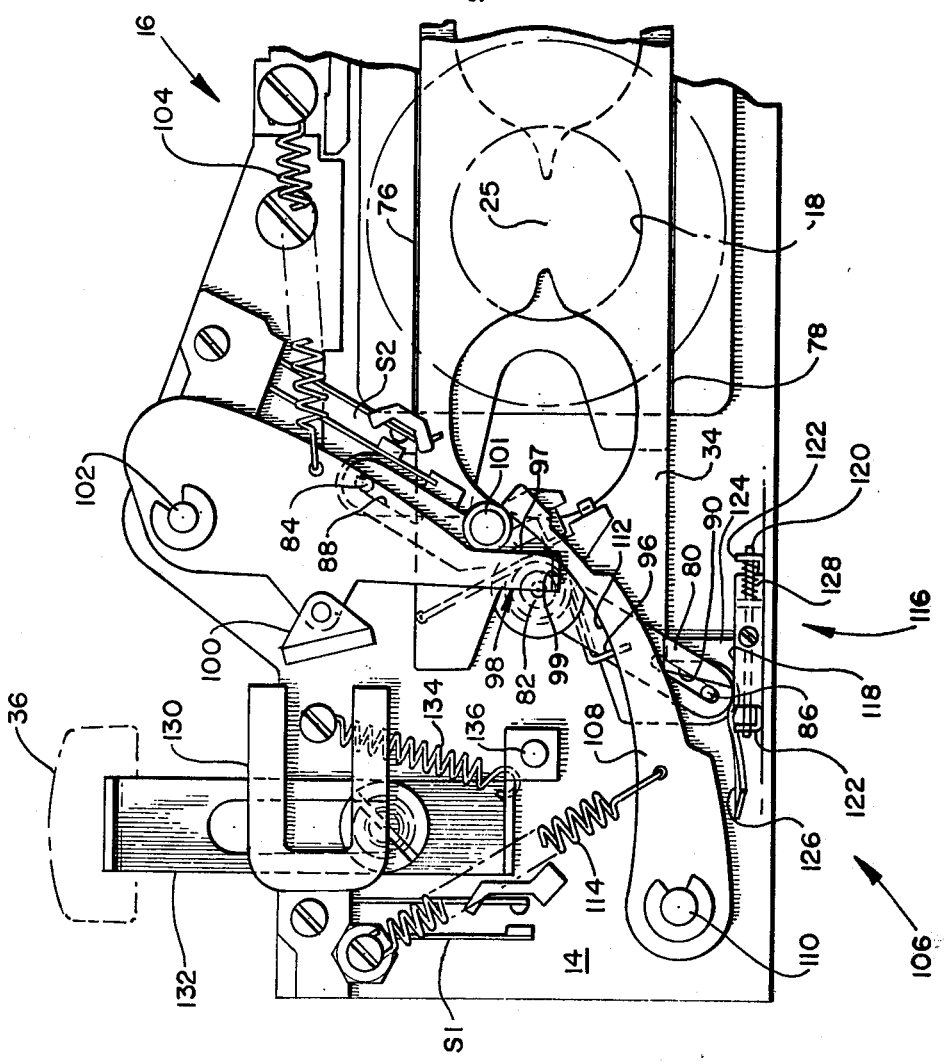
FIG. 4 is a front elevation of a portion of the exposure control system of FIG. 2 in still another mode of its operation.

Release of the button 36 by the user will thereafter result in the actuating member 134 returning to its first position as shown in FIG. 4 from its second position as shown in FIG. 5 under the urging influence of its biasing drive spring 134 thus permitting the spring elements 114 and 128 to move the latching means 106 from its second position back to its first position. Thus, the rotatable member 108 is moved from its second position back to its first position by the spring element 114 during which movement it disengages from the latch mechanism 116 thereby permitting the rotatable latch member 118 to rotate from its second position back into its first position under the resilient bias of its driving spring 128 thereby moving the integral lever arm portion 124 into engagement with the shutter blade pin 86 so as to restrain the blade mechanism from moving from its scene light blocking arrangement. The cam surface 112 associated with the rotatable member 108 is thereafter operative during movement of the member 108 from its second position back to its first position (see FIG. 4) to engage the tab portion 99 at the end of the lever arm 98 and rotate the lever arm 98 about its pivot pin 102 and against the urging of the resilient bias of the spring element 114 back to its position adjacent the electromagnet 130 as shown in FIG. 2 from which it was initially released. As is now readily apparent, the electromagnet 130 need not be reenergized until the initiation of a subsequent photographic cycle by depression of the button 36 in the aforementioned manner since the force of spring element 114 operating on the rotatable member 118 overrides the spring force of spring element 104 operating on lever arm 98. Thus, the photographic cycle of a self-developing camera utilizing "scanning type" shutter blade elements may be effected without the use of a solenoid by drive spring elements which operate to drive the walking beam 80 in the aforementioned manner. The use of an electromagnet instead of a solenoid can result in a substantial cost reduction together with a potential decrease in the closing time otherwise required for the shutter blade elements to be moved from their scene light unblocking arrangement back to their scene light blocking arrangement.

Since certain changes my be made in the above described embodiment without departing from the scope of the invention herein involved, it is intended that all matter contained in the above-description or shown in the accompanying drawings be interpreted as illustrative and not in a limiting sense.

What is claimed is:

1. A photographic camera apparatus having means for mounting photographic film material at a given focal plane, said camera comprising:

a blade mechanism;

means for mounting said blade mechanism for displacement between at least one blocking arrangement precluding transmission of scene light to the focal plane and an unblocking arrangement defining at least one aperture value structured for transmission of scene light to the focal plane;

first selectively actuable drive means for urging displacement of said blade mechanism from said blocking arrangement toward said unblocking arrangement;

second selectively actuable drive means for urging displacement of said blade mechanism from said unblocking arrangement toward said blocking arrangement;

first latch means movable between first and second positions for restraining said blade mechanism in said blocking arrangement against the urging of said first drive means and restraining said second drive means from urging displacement of said blade mechanism while said first latch means is in said first position, said first latch means being selectively actuable to move from its said first position to its said second position to effect the release of said blade mechanism and said second drive means, said blade mechanism thereafter moving under the influence of said first drive means from said blocking position toward said unblocking position to commence an exposure cycle;

second latch means for restraining said second drive means from urging displacement of said blade mechanism upon the release of said second drive means by said first latch means, said second latch means being thereafter actuable to cause the release of said second drive means and effect the displacement of said blade mechanism from said unblocking arrangement toward said blocking arrangement under the influence of said second drive means and thereby completing said exposure cycle; and means for moving said first latch means from said second position back to said first position, said first latch means being operative during said movement from said second position toward said first position to maintain said blade mechanism in said blocking arrangement against the urging of said first drive means while simultaneously restraining said second drive means from urging displacement of said blade mechanism.

2. The photographic camera of claim 1 wherein said first latch means includes a rotatable member connected for rotatable movement between said first and second positions, said rotatable member having a cam surface associated therewith for engagement with said second drive means when said rotatable member is in its said first position in order to restrain said second drive means from urging displacement of said blade mechanism, said first latch means additionally including a latch mechanism connected for movement between said first and second positions, said latch mechanism engaging said blade mounting means when in its first position in order to hold said blade mechanism in its said blocking arrangement against the urging of said first drive means, said rotatable member upon movement into its said second position being operative to engage said latch mechanism so as to move said latch mechanism into its said second position so as to release said blade mechanism for movement toward its said second arrangement under the influence of said first drive means, said rotatable member being thereafter operative subsequent to said exposure cycle during movement of said rotatable member from its said second position back to its said first position to disengage from said latch mechanism so as to permit said latch mechanism to move into its said first position to maintain said blade mechanism in said blocking arrangement and to thereafter engage said second drive means to restrain said urging influence of said second drive means.

3. The photographic camera of claim 2 wherein said second drive means includes a rotatable lever arm disposed for pivotal movement into engagement with said blade mounting means together with a resilient element for continuously urging said lever arm into engagement with said blade mounting means, said lever arm being releasable by said second latch means to be urged by said resilient element into engagement with said blade mounting means when said blade mechanism is in said unblocking arrangement to drive said blade mechanism from said unblocking arrangement to said blocking arrangement, said cam surface being thereafter operative during movement of said rotatable member from its said second position back to its said first position to engage said lever arm and rotate said lever arm against the urging of said resilient element back to its position from which it was initially released by said second latch means.

4. The photographic camera of claim 3 wherein said second latch means includes an electromagnet disposed to engage said lever arm when said lever arm is disengaged from said first latch means, said electromagnet when energized operating to latch said lever arm and restrain said lever arm from moving under the urging influence of said resilient element.

5. The photographic camera of claim 2 including manually actuable means for controlling the actuation of said first latch means rotatable member, said manually actuable means having at least one actuating member disposed for manual displacement from a first position to a second position and resiliently biased to move from its said second position back to its said first position upon manual deactuation thereof, said actuating member being disposed to engage said first latch means rotatable member so as to move said rotatable member from its said first position to its said second position in correspondence with manual displacement of said actuating member from its said first position to its said second position wherein the subsequent manual release of said actuating member permits said actuating member to return to its said first position from its said second posiiton under the influence of its said resilient bias thereby permitting said moving means to move said first latch means rotatable member from its said second position back to its said first position.

6. The photographic camera of claim 5 wherein said means for moving said first latch means from said second position back to said first position includes a resilient element for yieldably biasing said first latch means rotatable member to move from its said second position back to its said first position.

7. The photographic camera of claim 1 wherein said second drive means includes a lever arm pivotally connected for rotatable movement into engagement with said blade mounting means together with a resilient element for continuously urging said lever arm into rotation in one direction to ultimately engage said blade mounting means, said lever arm being releasable by said second latch means to be urged by said resilient element into engagement with said blade mounting means when said blade mechanism is in said unblocking arrangement to drive said blade mechanism from its said unblocking arrangement back to said blocking arrangement, said first latch means being thereafter operative during movement from its said second position back to its said first position to rotatably drive said lever arm against the urging of said resilient element back to its position from which it was initially released by said second latch means.

8. The photographic camera of claim 7 wherein said second latch means includes an electromagnet disposed to engage said lever arm when said lever arm is in said restrained position, said electromagnet when energized operating to latch said lever arm and restrain said lever arm from moving under the urging influence of said resilient element.

9. A photographic camera apparatus having means for mounting photographic film material at a given focal plane, said camera comprising:
a blade mechanism;
means for mounting said blade mechanism for displacement along a predetermined path between a first arrangement wherein it precludes scene light from reaching the film plane and a second arrangement wherein it defines a maximum size aperture, said blade mechanism serving to define a range of progressively increasing sized apertures as it moves from its said first arrangement to its said second arrangement;
first selectively actuable drive means for urging displacement of said blade mechanism from its said first arrangement toward its said second arrangement;
second selectively actuable drive means for urging displacement of said blade mechanism from its said second arrangement back toward its said first arrangement against the urging of said first drive means;
first latch means movable between first and second positions for holding said blade mechanism in its said first arrangement against the urging of said first drive means and restraining said second drive means from urging displacement of said blade mechanism back toward its said first arrangement while said first latch means is in its said first position, said first latch means being selectively actuable to move from its said first position to its said second position to effect the release of said blade mechanism and said second drive means, said blade mechanism thereafter moving under the influence of said drive means from its said first arrangement toward its said second arrangement to commence an exposure cycle; and
second latch means for restraining said second drive means from urging displacement of said blade mechanism upon the release of said second drive means by said first latch means, said second latch means being thereafter actuable to cause the release of said second drive means and effect the displacement of said blade mechanism from its said second arrangement back toward its said first arrangement against the urging of said first drive means thereby completing said exposure cycle.

10. The photographic camera of claim 9 wherein said first latch means includes a rotatable member connected for rotatable movement between said first and second positions, said rotatable member having a cam surface associated therewith for engagement with said second drive means when said rotatable member is in its said first position in order to restrain said second drive means from urging displacement of said blade mechanism, said first latch means additionally including a latch mechanism connected for movement between said first and second positions, said latch mechanism engaging said blade mounting means when in its said first position in order to hold said blade mechanism in its said blocking arrangement against the urging of said first drive means, said rotatable member upon movement into its said second position being operative to engage said latch mechanism so as to move said latch mechanism into said second position so as to release said blade mechanism for movement toward its said second arrangement under the influence of said first drive means.

11. The photographic camera of claim 10 wherein said second drive means includes a rotatable lever arm disposed for movement into engagement with said blade mounting means together with a resilient element for continuously urging said lever arm into engagement with said blade mounting means, said lever arm being releasable by said second latch mens to be urged by said resilient element into engagement with said blade mounting means when said blade mechanism is in said second arrangement to drive said blade mechanism from said second arrangement back to said first arrangement.

12. The photographic camera of claim 11 wherein said second latch means includes an electromagnet disposed to engage said lever arm when said lever arm is disengaged from said first latch means, said electromagnet when energized operating to latch said lever arm and restrain said lever arm from moving under the urging influence of said resilient element.

13. The photographic camera of claim 10 including manually actuable means for controlling the actuation of said first latch means rotatable member, said manually actuable means having at least one actuating member disposed for manual displacement from a first position to a second position and resiliently biased to move from its said second position back to its said first position upon manual deactuation thereof, said actuating member being disposed to engage said first latch means rotatable member so as to move said rotatable member from its said first position to its said second position in correspondence with manual displacement of said actuating member from its said first position to its said second position wherein the subsequent manual release of said actuating member permits said actuating member to return to its said first position from its said second position under the influence of its said resilient bias.

14. The photographic camera of claim 9 wherein said second drive means includes a lever arm pivotally connected for rotatable movement into engagement with said blade mounting means together with a resilient element for continuously urging said lever arm into rotation in one direction to ultimately engage said blade mounting means, said lever arm being releasable by said second latch means to be urged by said resilient element into engagement with said blade mounting means when said blade mechanism is in said unblocking arrangement to drive said blade mechanism from its said unblocking arrangement back to said blocking arrangement.

15. The photographic camera of claim 14 wherein said second latch means includes an electromagnet disposed to engage said lever arm when said lever arm is in said restrained position, said electromagnet when energized operating to latch said lever arm and restrain said lever arm from moving under the influence of said resilient element.

* * * * *